United States Patent
Arthur et al.

(10) Patent No.: US 8,232,018 B2
(45) Date of Patent: Jul. 31, 2012

(54) ANODE FLOWSHIFTING WITH CLOSED-INJECTOR BLEEDING

(75) Inventors: David A. Arthur, Honeoye Falls, NY (US); Abdullah B. Alp, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2240 days.

(21) Appl. No.: 11/238,322

(22) Filed: Sep. 29, 2005

(65) Prior Publication Data
US 2007/0072020 A1    Mar. 29, 2007

(51) Int. Cl.
  *H01M 8/04* (2006.01)
  *H01M 8/24* (2006.01)
(52) U.S. Cl. ........................................ 429/444; 429/471
(58) Field of Classification Search .................. None
   See application file for complete search history.

(56) References Cited

U.S. PATENT DOCUMENTS

| 2003/0054211 A1 | 3/2003 | Charlat |
| 2005/0129993 A1* | 6/2005 | Eisler et al. ............... 429/17 |

FOREIGN PATENT DOCUMENTS

| JP | 5343082 | 12/1993 |
| JP | 2003-115310 | 4/2003 |

* cited by examiner

*Primary Examiner* — Jonathan Crepeau
(74) *Attorney, Agent, or Firm* — John A. Miller; Miller IP Group, PLC

(57) ABSTRACT

A fuel cell system that employs a technique for nitrogen bleeding. The fuel cell system includes a fuel cell stack having a first sub-stack and a second sub-stack, where the hydrogen gas flow is flow-shifted between the sub-stacks. A first nitrogen bleed valve is provided in an anode gas input line coupled to the first sub-stack and a second nitrogen bleed valve is provided in an anode gas input line coupled to the second sub-stack. When the first sub-stack is receiving the anode gas, and a nitrogen bleed is requested, the first bleed valve is closed and the second bleed valve is opened to provide the nitrogen bleeding. When the second sub-stack is receiving the anode gas, and a nitrogen bleed is requested, the second bleed valve is closed and the first bleed valve is opened to provide the nitrogen bleed.

20 Claims, 2 Drawing Sheets

ANODE FLOWSHIFTING WITH CLOSED-INJECTOR BLEEDING

BACKGROUND OF THE INVENTION

1. Field of the Invention

This invention relates generally to a system and method for bleeding nitrogen from the anode side of a fuel cell stack and, more particularly, to a system and method for bleeding nitrogen from the anode side of a split fuel cell stack that employs flow-shifting, where a separate bleed valve is provided at an inlet/outlet end of both sub-stacks.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For example, a typical fuel cell stack for a vehicle may have two hundred or more stacked fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

The MEAs are porous and thus allow nitrogen in the air from the cathode side of the stack to permeate through the membrane and collect in the anode side, referred to in the industry as nitrogen cross-over. Nitrogen in the anode side of the fuel cell stack dilutes the hydrogen so that if the nitrogen concentration increases above a certain percentage, such as 50%, the fuel cell stack becomes unstable and may fail.

For automotive applications, it typically takes about 400 fuel cells to provide the desired power. Because so many fuel cells are required for the stack in automotive fuel cell system designs, the stack is sometimes split into two sub-stacks each including about 200 fuel cells because it is difficult to effectively provide an equal flow of hydrogen gas through 400 fuel cells in parallel.

Also, the membranes within a fuel cell need to have a certain relative humidity so that the ionic resistance across the membrane is low enough to effectively conduct protons. This humidification may come from the stack water by-product or external humidification. The flow of hydrogen through the anode gas flow channels has a drying effect on the membrane, most noticeably at an inlet of the hydrogen flow. Also, the accumulation of water droplets within the anode gas flow channels from the membrane relative humidity and water by-product could prevent hydrogen from flowing therethrough, and cause the cell to fail because of low reactant gas flow, thus affecting the stack stability. The accumulation of water in the reactant gas flow channels is particularly troublesome at low stack output loads.

It has previously been proposed in the art to provide anode reactant gas flow-shifting, where the direction of the anode gas flow through the stack is periodically reversed so that the drying effect from dry hydrogen at the anode inlet does not continually happen at one end of the stack. Further, by providing flow-shifting, the water produced by the stack is better used to provide humidification of the membrane.

FIG. 1 is a schematic diagram of a portion of a known fuel cell system 10 of the type discussed above that employs flow-shifting. The fuel cell system 10 includes a fuel cell stack 12 that is separated into a first sub-stack 14 and a second sub-stack 16. An anode inlet unit 18 controls the flow and pressure of hydrogen from a hydrogen source 20, such as a compressed hydrogen tank, to a first anode input line 22 coupled to the sub-stack 14 and a second anode input line 24 coupled to the sub-stack 16. A connector line 26 connects the hydrogen reactant gas flow channels in the sub-stacks 14 and 16 so that the anode gas exiting one of the sub-stacks 14 or 16 enters the other sub-stack 14 or 16 depending on which way the anode gas is flowing. A water separator 28 is provided in the line 26 that removes water from the gas flowing through the line 26.

The flow of hydrogen into the fuel cell stack 12 is flow-shifted in that hydrogen gas is first provided to the stack 12 on the anode input line 22, and then the flow is reversed so that the hydrogen gas is provided to the stack 12 on the anode input line 24. The reversing of the hydrogen gas flow is continued in this manner. The flow-shifting typically occurs with a cycle of 1 to 5 seconds for each flow direction for an overall cycle period of 2-10 seconds.

Hydrogen gas from the hydrogen source 20 is provided on line 30. When the hydrogen gas is being sent to the stack 12 on the line 22, injector valves 32, 34 and 36 control the flow of the hydrogen gas to the stack 12. At low flow rates, a controller (not shown) closes the injector valves 32 and 34 and selectively increases the duty cycle of the injector 36 as the hydrogen gas flow rate demand increases. When the duty cycle of the injector valve 36 reaches 100% (continuously open), then the controller selectively increases the duty cycle of the injector valve 34 as the hydrogen gas flow rate demand increases. This process continues as the demand increases until all three of the injector valves 32, 34 and 36 have a 100% duty cycle, providing a maximum hydrogen gas flow rate. Decreases in hydrogen gas flow rate is provided in the same manner. More or less of the injector valves can be provided in other designs. When the flow-shifts to the input line 24, the valves 32-36 are closed, and valves 38, 40 and 42 are used to control the hydrogen gas flow to the stack 12 in the same manner.

A cathode line 46 is coupled to the cathode input (not shown) of the stack 12 and the line 30. In certain fuel cell system designs, a small amount of hydrogen is provided to the cathode side of the stack 12 at system start-up. The hydrogen reacts with air on the cathode side of the stack 12 to provide a reaction that generates heat so that the temperature of the fuel cell stack 12 can be quickly increased to a desirable operating temperature. Providing the hydrogen gas to the cathode side of the stack 12 at system start-up is particularly useful in low temperature environments. To selectively provide the hydrogen to the line 46, a control valve 48 is provided in the line 30 and controlled in the manner discussed above at system start-up for this purpose.

Also, it may be desirable in certain fuel cell system designs to purge the anode side of the fuel cell stack 12 at system shut-down with air from the compressor (not shown) to remove the remaining hydrogen and water in the flow channels in the anode side of the stack 12. Removing the hydrogen from the anode side at system shut-down has certain well-known benefits, and removing the water from the flow channels prevents it from freezing in the stack 12 in low temperature environments. To provide the anode purge, the anode inlet unit 18 includes a pair of purge valves 50 and 52 that are coupled between the anode input line 22 and the cathode line 46. Likewise, a pair of purge valves 54 and 56 are coupled between the anode input line 24 and the cathode line 46. Therefore, at system shut-down, the valves 32-42 are closed and the valves 50-56 are opened to purge the anode side of the stack 12.

As discussed above, it is desirable to bleed nitrogen from the anode side of the fuel cell stack 12 during stack operation to increase stack stability. A bleed valve 64 is coupled to the line 26 to provide the nitrogen bleed. In one design, bled nitrogen, hydrogen, water, etc. from the bleed valve 64 is sent to a cathode exhaust of the system 10. The concentration of hydrogen in the bled material is low enough so as not to cause a combustion problem. Hydrogen is periodically bled from the line 26 through the bleed valves 64 depending on various factors.

During the times when the anode gas is being bled through the bleed valve 64 to remove the nitrogen, fresh hydrogen that was intended for the down stream sub-stack 14 or 16 was being bled off, and was not being provided to the sub-stack 14 or 16. Only a small amount of hydrogen was able to get through to the down stream sub-stack 14 or 16 when the bleed valve 64 is open as a result of the pressure differential created by the bleed valve 64 being open and hydrogen being consumed by the downstream sub-stack 14 or 16. This lack of hydrogen to the sub-stack 14 or 16 affected the stack stability in that the cell voltages would drop dramatically. Thus, bleeding of the nitrogen from the stack 12 in the system 10 had an effect on stack performance.

SUMMARY OF THE INVENTION

In accordance with the teachings of the present invention, a fuel cell system is disclosed that employs a technique for nitrogen bleeding. The fuel cell system includes a fuel cell stack having a first sub-stack and a second sub-stack. The flow of hydrogen gas to the fuel cell stack is controlled by an anode inlet unit, where the hydrogen gas flow is flow-shifted between the sub-stacks. A first nitrogen bleed valve is provided in an anode gas input line coupled to the first sub-stack and a second nitrogen bleed valve is provided in an anode gas input line coupled to the second sub-stack. When the first sub-stack is receiving the anode gas, and a nitrogen bleed is requested, the first bleed valve in the input line for the first sub-stack is closed and the second bleed valve is opened to provide the nitrogen bleeding. When the second sub-stack is receiving the anode gas, and a nitrogen bleed is requested, the second bleed valve in the input line for the second sub-stack is closed and the first bleed valve is opened to provide the nitrogen bleed.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system that includes a fuel cell stack having a first sub-stack and a second sub-stack, and a first nitrogen bleed valve at an input to the first sub-stack and a second nitrogen bleed valve at the input of the second sub-stack is merely exemplary in nature, and is in no way intended to limit the invention or its applications or uses.

Figure 1:
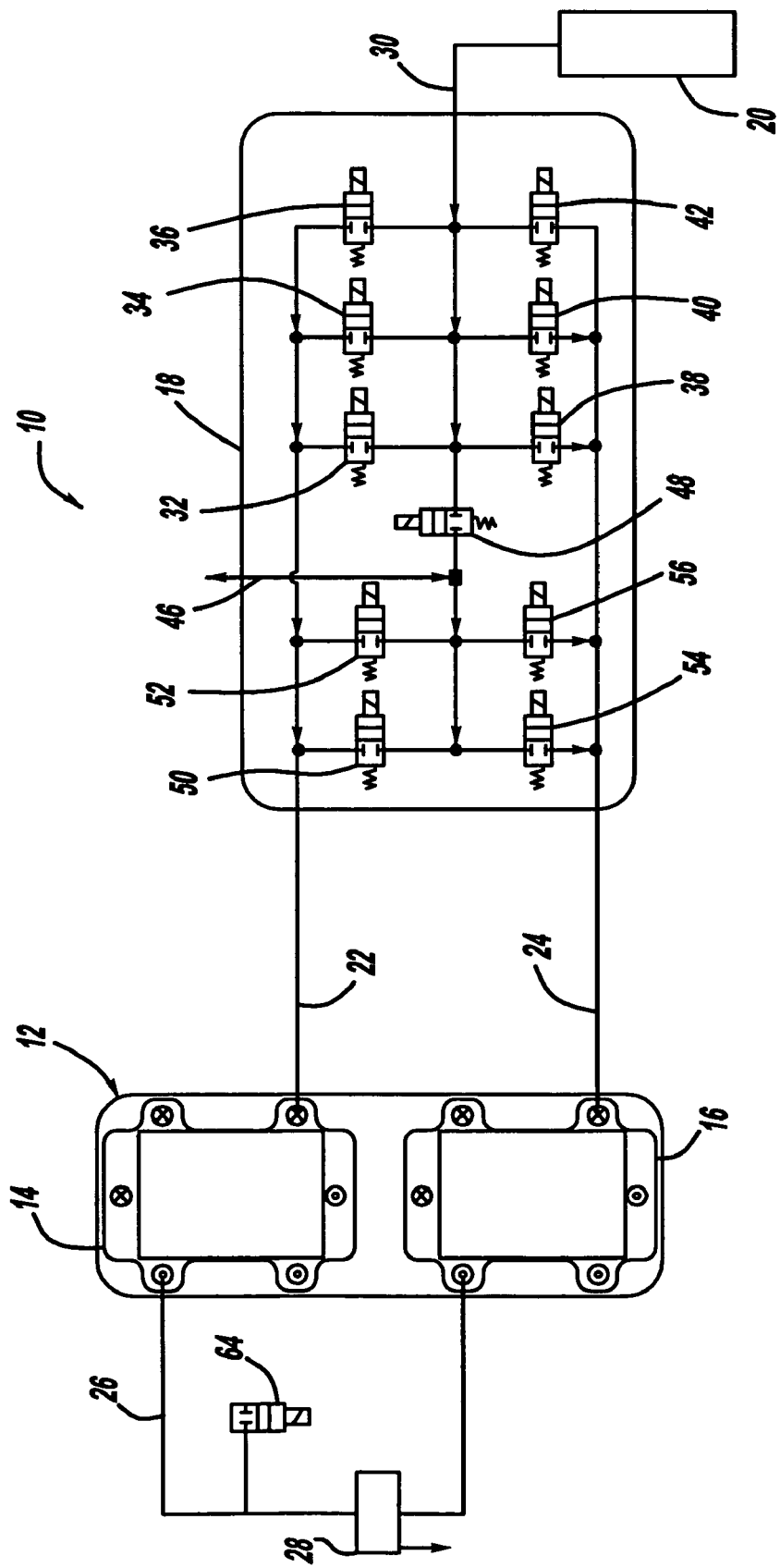
FIG. 1 is a schematic diagram of a known fuel cell system including a stack having a first sub-stack and a second sub-stack, where a nitrogen bleed valve is provided between the stacks.
Figure 2:
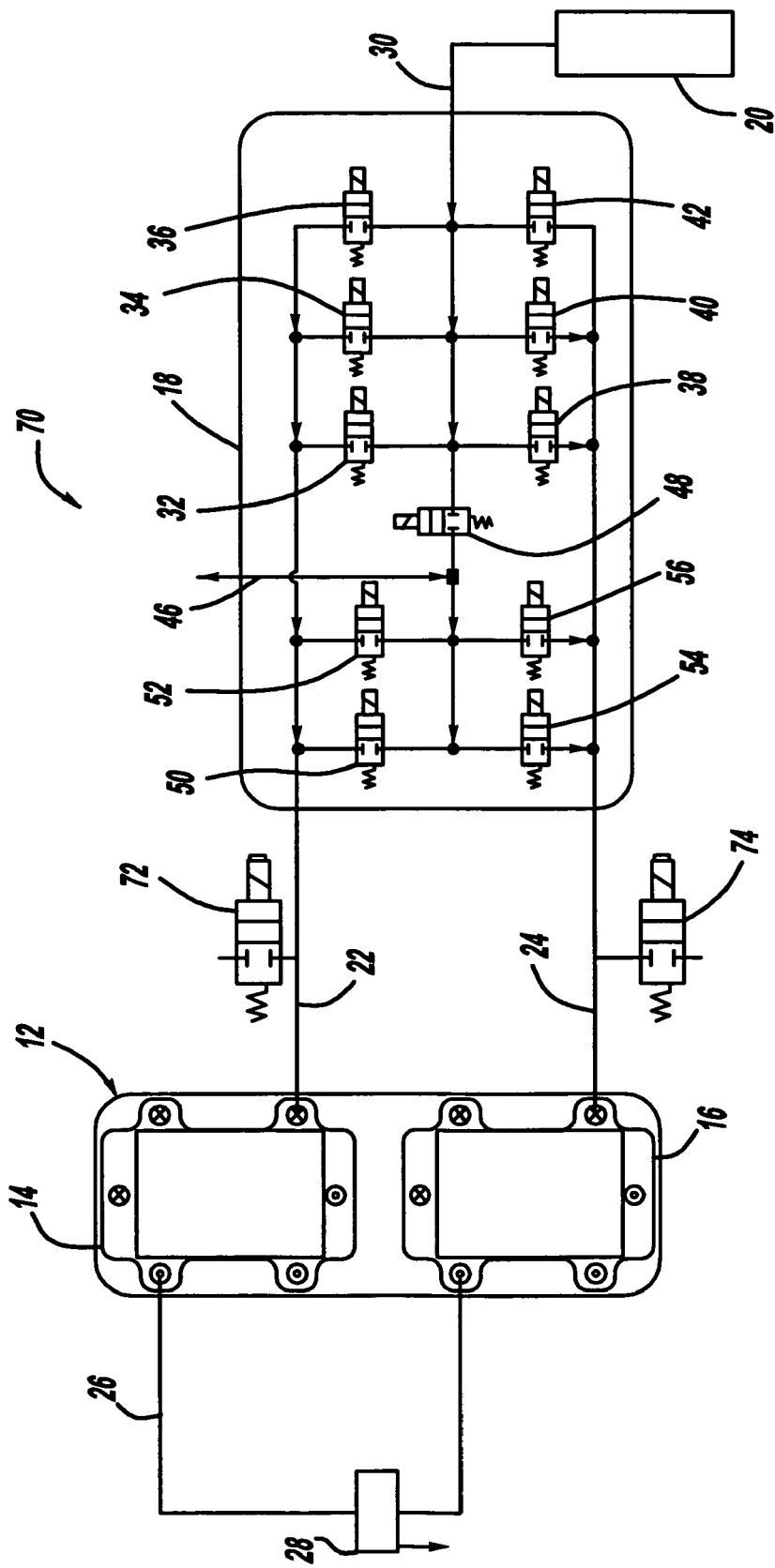
FIG. 2 is a schematic diagram of a fuel cell system including a fuel cell stack having a first sub-stack and a second sub-stack, where a nitrogen bleed valve is provided in an input line to the first sub-stack and a nitrogen bleed valve is provided in an input line to the second sub-stack, according to an embodiment of the present invention.

FIG. 2 is a schematic diagram of a fuel cell system 70 similar to the fuel cell system 10, where like elements are identified by the same reference numeral, according to an embodiment of the present invention. In this embodiment, the nitrogen bleed valve 64 between the sub-stacks 12 and 14 has been eliminated. Further, a first nitrogen bleed valve 72 is provided in the anode input line 22 and a second nitrogen bleed valve 74 is provided in the anode input line 24. Both of the valves 72 and 74 are shown in the closed position. When the anode flow is shifted so that the anode gas is being provided to the anode input line 22 as discussed above, and the control has requested a nitrogen bleed, the first bleed valve 72 is closed and the second bleed valve 74 is opened. Likewise, when the anode gas flow is shifted so the anode input gas is being provided to the second anode input line 24, and the controller requests a nitrogen bleed, the second bleed valve 74 is closed and the first bleed valve 72 is opened. Therefore, when a bleed is requested, the bleed valve at the output of the downstream sub-stack 14 or 16 is opened so that fresh hydrogen is provided to both sub-stacks 14 and 16 before the nitrogen bleed occurs. The request for a nitrogen bleed depends on many factors, such as the age of the stack. Further, the flow-shifting typically occurs with a cycle of 1 to 5 seconds for each flow direction for an overall cycle period of 2-10 seconds.

The combination of the hydrogen, nitrogen, water and other material that is bled through the bleed valves 72 and 74 can be sent to any suitable water vapor transfer. Different fuel cell system designs can use this bled product differently. In one embodiment, the bled material is combined with the cathode exhaust and sent to the environment. The concentration of hydrogen in the material is not significant enough to pose a combustion problem.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a split fuel cell stack including a first sub-stack and a second sub-stack;
   a first anode input line coupled to the first sub-stack;
   a second anode input line coupled to the second sub-stack;
   a connector line for connecting anode flow channels in the first and second sub-stacks;
   a hydrogen source for providing hydrogen gas to the first and second anode input lines;
   a first nitrogen bleed valve coupled to the first input line; and
   a second nitrogen bleed valve coupled to the second input line, wherein when the hydrogen source provides the hydrogen gas to the first input line and a nitrogen bleed is requested, the first bleed valve is closed and the second bleed valve is opened, and when the hydrogen source provides the hydrogen gas to the second anode input line and a nitrogen bleed is requested, the second bleed valve is closed and the first bleed valve is opened.

2. The system according to claim 1 further comprising an anode inlet unit, said anode inlet unit including a plurality of control valves for controlling the hydrogen gas flow to the first anode input line and the second anode input line.

3. The system according to claim 2 wherein the anode inlet unit includes six control valves for controlling the hydrogen gas flow to the first and second anode line, wherein three of the plurality of control valves are selectively opened and closed to control the flow rate of the hydrogen gas to the first input line and three of the plurality of control valves are selectively opened and closed to control the flow rate of the hydrogen gas to the second anode input line.

4. The system according to claim 1 wherein the flow of the hydrogen gas to the first anode input line and the second anode input line is flow-shifted where the flow of the hydrogen gas is provided to the first sub-stack for a predetermined period of time and then to the second sub-stack for the predetermined period of time in a cyclical manner.

5. The system according to claim 4 wherein the predetermined period of time is in the range of 1-5 seconds.

6. The system according to claim 1 wherein the bled nitrogen from the first and second nitrogen bleed valve is combined with a cathode exhaust from the fuel cell stack.

7. The system according to claim 1 wherein the first and second sub-stacks each include about 200 fuel cells.

8. The system according to claim 1 further comprising a water separator positioned in the connector line.

9. The system according to claim 1 wherein the fuel cell system is on a vehicle.

10. A fuel system comprising:
    a split fuel cell stack including a first sub-stack and a second sub-stack;
    a connector line for connecting anode flow channels in the first and second sub-stacks;
    a hydrogen source for providing hydrogen gas to the fuel cell stack; and
    at least one nitrogen bleed valve provided in a line between the fuel cell stack and the source, said at least one nitrogen bleed valve bleeding nitrogen from the fuel cell stack after the first and second sub-stacks receive fresh hydrogen.

11. The system according to claim 10 wherein the at least one nitrogen bleed valve is a first nitrogen bleed valve being positioned in an anode input line coupled to the first sub-stack and a second nitrogen bleed valve positioned in a second anode input line coupled to the second sub-stack.

12. The system according to claim 10 wherein the flow of the hydrogen gas to the first anode input line and the second anode input line is flow-shifted where the flow of the hydrogen gas is provided to the first sub-stack for a predetermined period of time and then to the second sub-stack for the predetermined period of time in a cyclical manner.

13. The system according to claim 12 wherein the predetermined period of time is in the range of 1-5 seconds.

14. The system according to claim 10 wherein the bled nitrogen from the first and second nitrogen bleed valve is combined with a cathode exhaust from the fuel cell stack.

15. The system according to claim 10 wherein the first and second sub-stacks each include about 200 fuel cells.

16. A method for bleeding nitrogen from a fuel cell stack, said method comprising:
    separating the fuel cell stack into a first sub-stack and a second sub-stack;
    connecting anode gas flow channels in the first sub-stack and the second sub-stack with a connector line;
    flow-shifting a hydrogen gas flow between the first sub-stack and the second sub-stack;
    bleeding nitrogen through a first nitrogen bleed valve at an output of the second sub-stack when the hydrogen gas flow is being provided to the first sub-stack; and
    bleeding nitrogen from a second nitrogen bleed valve at an output of the first sub-stack when the hydrogen gas flow is being provided to the second sub-stack.

17. The method according to claim 16 wherein flow-shifting the hydrogen gas flow includes flow-shifting the hydrogen gas flow in a cyclical manner having a cycle in the range of 2-10 seconds.

18. The method according to claim 16 further comprising combining the bled nitrogen from the first and second nitrogen bleed valves with a cathode exhaust from the fuel cell stack.

19. The method according to claim 16 further comprising separating water from the anode gas flowing through the connector line.

20. The method according to claim 16 wherein the first sub-stack and the second sub-stack each include about 200 fuel cells.

* * * * *